United States Patent [19]
Brizzi et al.

[11] Patent Number: 5,680,745
[45] Date of Patent: Oct. 28, 1997

[54] PACKING METHOD AND MACHINE FOR PRODUCING TWIN PACKETS OF CIGARETTES

[75] Inventors: Marco Brizzi, Zola Predosa; Antonio Gamberini, Bologna, both of Italy

[73] Assignee: G.D Societa' Per Azioni, Bologna, Italy

[21] Appl. No.: 374,955

[22] Filed: Jan. 19, 1995

[30] Foreign Application Priority Data

Jan. 20, 1994 [IT] Italy ................... BO94A0014

[51] Int. Cl.⁶ ................................... B65B 35/30
[52] U.S. Cl. ................. 53/448; 53/53; 53/54; 53/171; 53/228; 53/449; 53/466; 131/283
[58] Field of Search ................... 53/53, 54, 443, 53/466, 448, 449, 171, 228, 229, 230, 231, 232, 233, 234; 131/283

[56] References Cited

U.S. PATENT DOCUMENTS

| | | | |
|---|---|---|---|
| 4,134,502 | 1/1979 | Seragnoli | 53/54 X |
| 4,258,528 | 3/1981 | Focke | 53/230 X |
| 4,330,061 | 5/1982 | Rudszinat et al. | 53/53 X |
| 4,530,199 | 7/1985 | Manservisi et al. | 53/53 |
| 4,718,216 | 1/1988 | Focke et al. | 53/234 X |
| 4,814,072 | 3/1989 | Von Wichert et al. | 53/53 X |
| 4,840,007 | 6/1989 | Focke et al. | 53/234 X |
| 4,909,020 | 3/1990 | Focke | 53/466 |
| 4,932,190 | 6/1990 | Bergner et al. | 53/443 |
| 5,101,609 | 4/1992 | Cook | 53/53 |
| 5,153,279 | 10/1992 | Draghetti | 53/53 X |
| 5,461,842 | 10/1995 | Brizzi et al. | 53/234 |

FOREIGN PATENT DOCUMENTS 1 573 634  8/1980  United Kingdom.

*Primary Examiner*—Daniel Moon
*Attorney, Agent, or Firm*—Marshall, O'Toole, Gerstein, Murray & Borun

[57] ABSTRACT

Twin packets of cigarettes, each consisting of two half packets with respective foil wrappings and arranged side by side inside an outer wrapping, are formed on a wrapping line by feeding a single succession of half packets along the input portion of the wrapping line, and successively transferring the half packets to the output portion of the wrapping line by grouping the half packets into twos to form, at the output portion, a single succession of groups, each consisting of two side by side half packets.

10 Claims, 4 Drawing Sheets

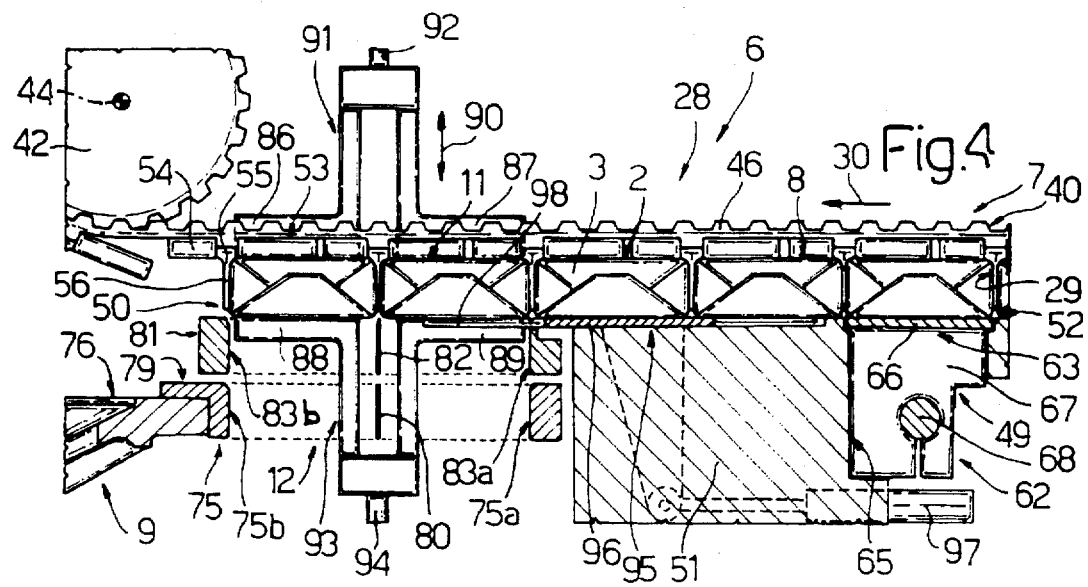
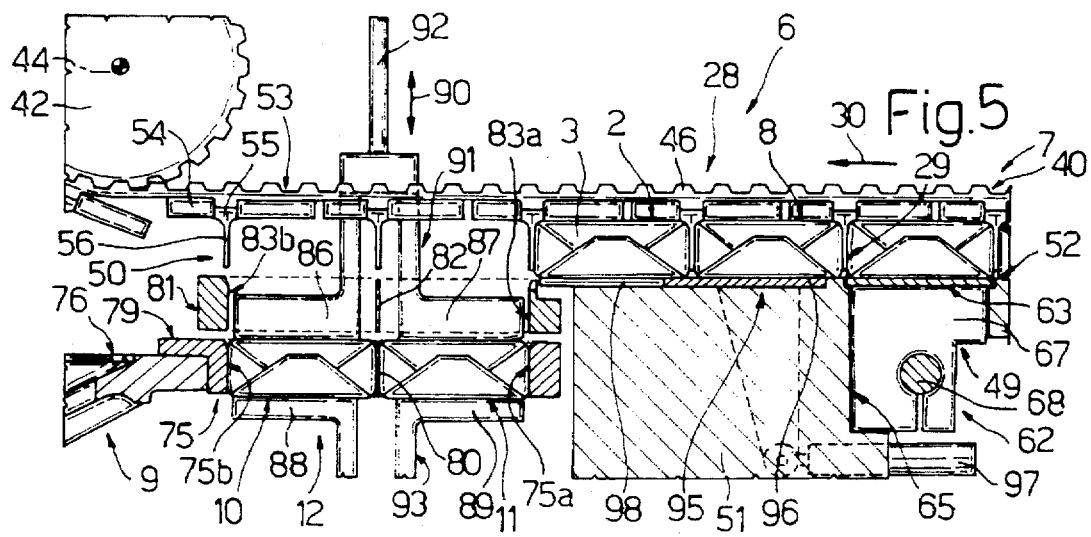
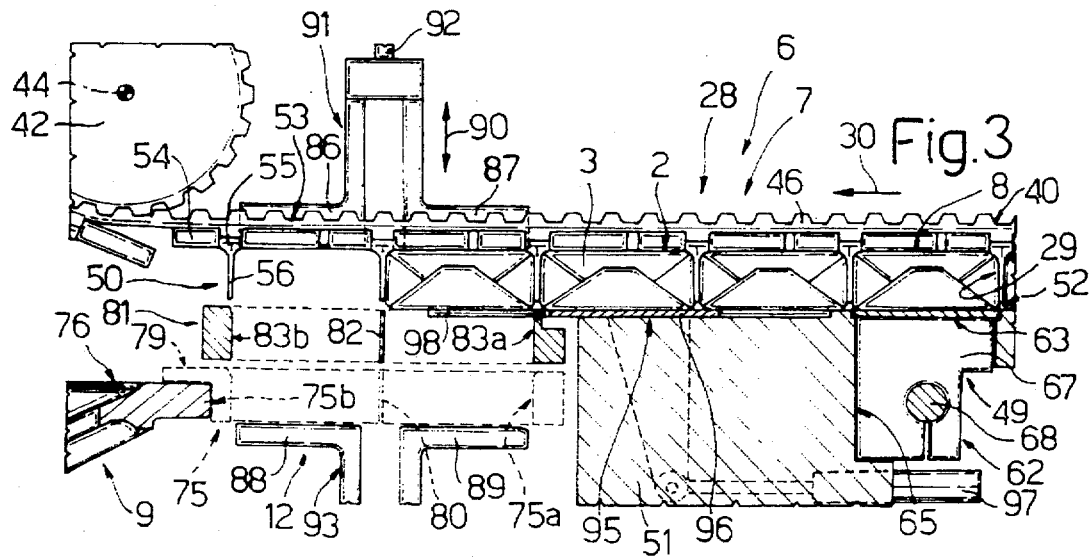

PACKING METHOD AND MACHINE FOR PRODUCING TWIN PACKETS OF CIGARETTES

BACKGROUND OF THE INVENTION

The present invention relates to a method of producing twin packets of cigarettes.

Here and hereinafter, the term "twin packet" is intended to mean a packet consisting of two half packets with respective foil wrappings and arranged side by side inside the same outer wrapping.

The method adopted by currently marketed twin-pack machines normally consists in simultaneously producing two successions of groups of cigarettes, and feeding the two successions along two first parallel wrapping lines on which a foil wrapping is formed about each group to produce a respective half packet. Each first wrapping line then feeds a succession of respective half packets to a transfer station, and each pair of half packets supplied to the transfer station defines a group of half packets which is transferred to a second wrapping line on which an outer wrapping is formed about each group.

The above method requires the use of first wrapping lines which, by virtue of comprising two side by side wrapping lines for two distinct successions of half packets, are extremely complex, expensive, and difficult to maintain and repair.

SUMMARY OF THE INVENTION

It is an object of the present invention to provide a method of producing twin packets, designed to overcome the aforementioned drawback.

According to the present invention, there is provided a method of producing twin packets of cigarettes, characterized in that it comprises the steps of feeding a single first succession of half packets along the input portion of a wrapping line; and transferring the half packets successively to the output portion of the wrapping line by grouping the half packets into twos to form, at said output portion, a single second succession of groups, each consisting of two side by side half packets.

The present invention also relates to a packing machine for producing twin packets.

According to the present invention, there is provided a packing machine for producing twin packets of cigarettes, characterized in that it comprises, in combination, a wrapping line in turn comprising an input portion for a single first succession of half packets, an output portion for a single second succession of groups, each consisting of two side by side half packets, and a pairing device interposed between the input and output portions and which provides for successively forming the groups by grouping into twos the half packets issuing from the input portion, and for successively feeding the groups to the output portion.

BRIEF DESCRIPTION OF THE DRAWINGS

A non-limiting embodiment of the present invention will be described by way of example with reference to the accompanying drawings, in which:

FIGS. 3, 4 and 5 show larger-scale views of a first detail in FIG. 2 in three different operating positions;

DETAILED DESCRIPTION OF THE INVENTION

Figure 1:
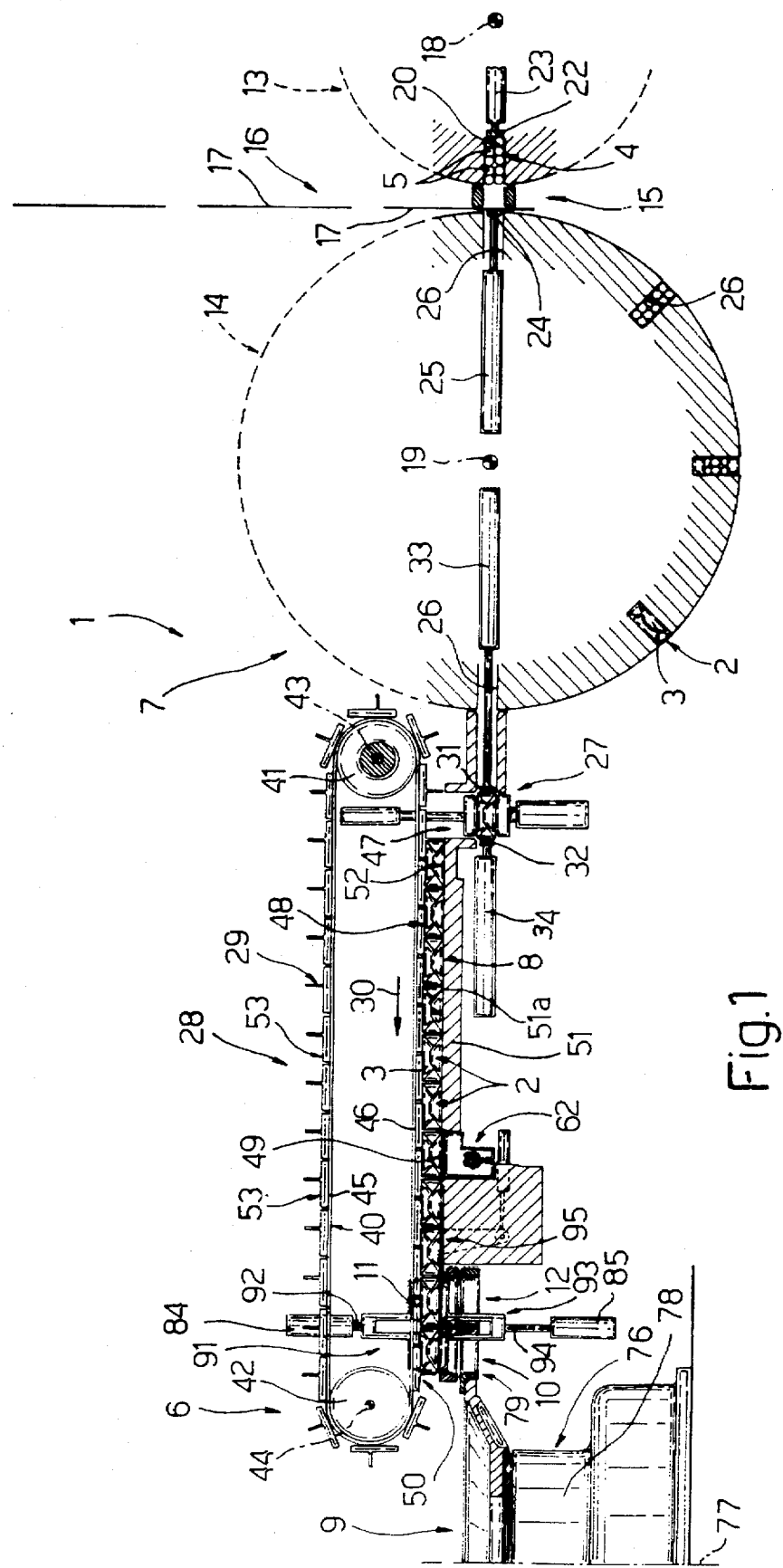
FIG. 1 shows a side view, with parts in section and parts removed for clarity, of a preferred embodiment of a portion of the machine according to the present invention.

Number 1 in FIG. 1 indicates a packing machine for producing twin packets (not shown), i.e. packets comprising two half packets 2, each comprising a foil wrapping 3 enclosing a group 4 of ten cigarettes 5 in two superimposed layers.

Machine 1 comprises a single wrapping line 6 in turn comprising an input portion 7 for forming a single succession 8 of half packets 2; an output portion 9 (shown only partially) for forming a succession of twin packets (not shown) from a single succession 10 of groups or pairs 11 of side by side half packets 2; and a pairing device 12 interposed between input portion 7 and output portion 9, for successively forming pairs 11 by grouping into twos half packets 2 from input portion 7 and feeding pairs 11 successively to output portion 9.

With reference to FIG. 1, input portion 7 of line 6 is substantially the same as that of a normal packet wrapping line (not shown), and comprises a first and second wheel 13 and 14 substantially tangent to each other at a transfer station 15, and separated from each other at transfer station 15 by a known line 16 for supplying a succession of foil portions 17. Wheels 13 and 14 are mounted for rotation, the first anticlockwise and the second clockwise in FIG. 1, about respective substantially horizontal axes 18 and 19 parallel to each other and perpendicular to the FIG. 1 plane, and present respective numbers of peripheral pockets. The first of said pockets, indicated by 20, are equally spaced about the periphery of wheel 13 and, as wheel 13 is rotated in steps by a known actuating device (not shown), are fed in steps through a loading station (not shown) for receiving respective groups 4 of cigarettes 5 and feeding them successively to transfer station 15. Wheel 13 also comprises a fixed push device 22 operated by a respective actuating device 23 and cooperating with a fixed counterpush device 24 fitted to wheel 14, aligned with push device 22 and operated by a respective actuating device 25, for successively transferring groups 4, each with a respective foil portion 17, into respective pockets 26 equally spaced about the periphery of wheel 14.

Wheel 14 rotates about axis 19 in time with wheel 13, so that, for each step of wheels 13 and 14, a pocket 20 and a pocket 26 are positioned facing and aligned with each other at transfer station 15.

Wheel 14 is a known folding wheel, and presents known folding devices (not shown) for folding each foil portion 17 about respective group 4 to form a respective wrapping 3 and a respective finished half packet 2 as group 4 is fed between transfer station 15 and a transfer device 27 located diametrically opposite station 15 along the periphery of wheel 14 and which provides for transferring half packets 2 successively from wheel 14 to a conveyor 28. Conveyor 28 presents a succession of pockets 29 for receiving respective half packets 2, constitutes the output of input portion 7 of wrapping line 6, and extends in a substantially horizontal direction 30 perpendicular to axes 18 and 19.

Figure 2:
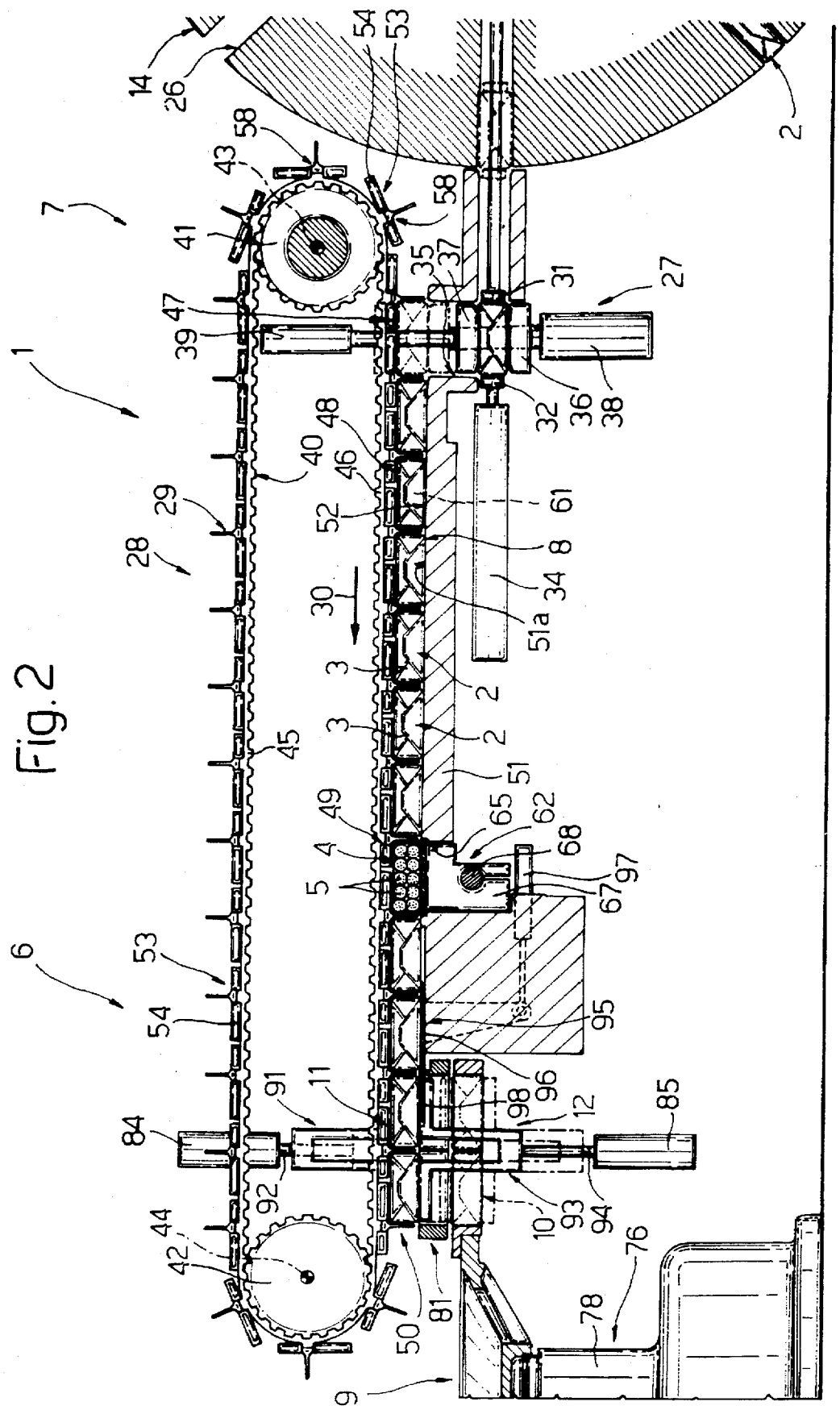
FIG. 2 shows a larger-scale view of a detail in FIG. 1.

As shown clearly in FIG. 2, device 27 comprises a known push device 31 and a known counterpush device 32 movable back and forth in known manner, by respective actuators 33 and 34, in a direction parallel to direction 30, for successively transferring half packets 2 from respective pockets 26 on wheel 14 into a feed channel 35 perpendicular to direction 30. Device 27 also comprises a further known push device 36 and a further known counterpush device 37 movable back and forth in known manner, by respective actuators 38 and 39, along at least part of channel 35, for successively transferring half packets 2 into respective pockets 29 on conveyor 28.

With reference to FIG. 2, conveyor 28 comprises two internally toothed belts 40, each looped about two pulleys 41 and 42, one of which is powered. Pulleys 41 and 42 are mounted for rotation about respective substantially horizontal axes 43 and 44 parallel to each other and to axes 18 and 19, and are respectively located adjacent to transfer device 27 and pairing device 12. On each belt 40, pulleys 41 and 42 define a top return branch 45, and a bottom transportation branch 46 which is fed in steps in direction 30 through a loading station 47 located at transfer device 27 and at the top end of channel 35, a reject station 48, a restoring station 49, and an unloading station 50 located at pairing device 12. Bottom branches 46 of belts 40 are arranged facing and parallel to a supporting and slide-along plate 51 extending parallel to direction 30 between loading and unloading stations 47 and 50, and defining, with bottom branches 46, a channel 52 along which to feed half packets 2.

Figure 6:
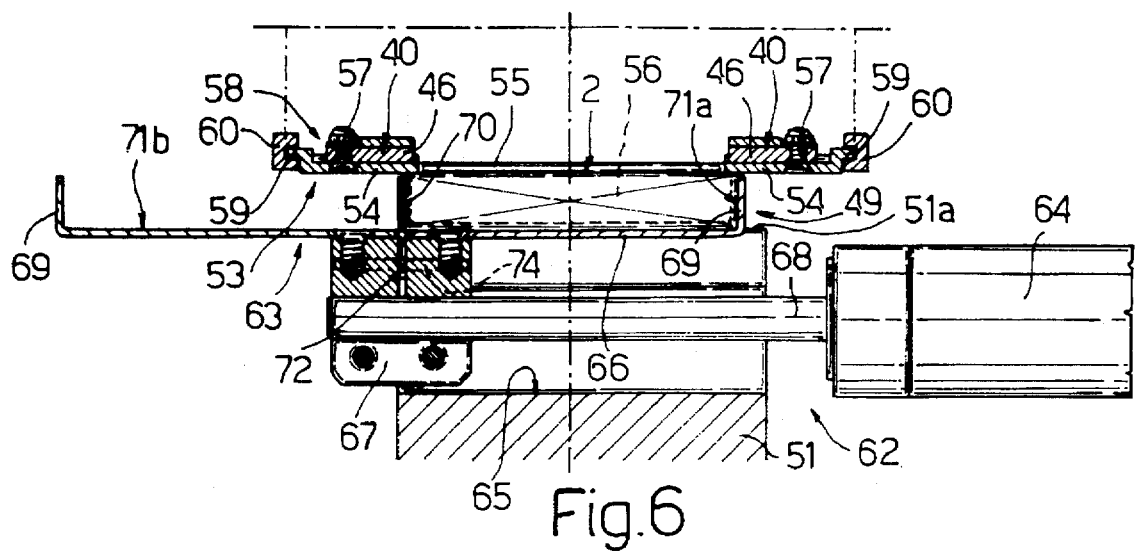
FIGS. 6 and 7 show larger-scale side views of a second detail in FIG. 2 in two different operating positions.
Figure 7:
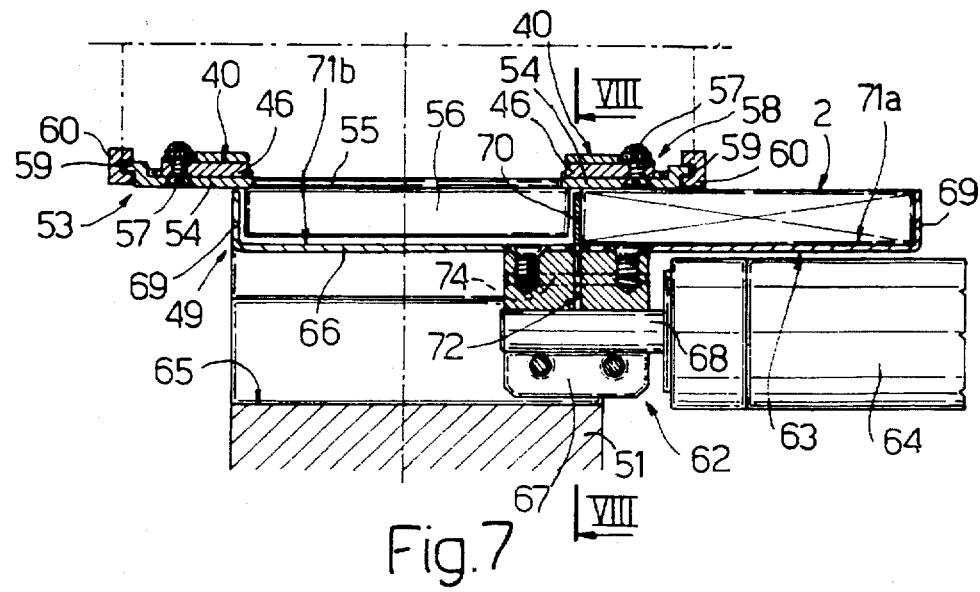

As shown clearly in FIGS. 6 and 7, belts 40 are made integral with each other by means of a succession of crosswise tracks 53, each of which, when viewed from above, is substantially H-shaped, and comprises two side members 54 extending along respective belts 40 and connected to each other by a central cross member 55 fitted integral with the inner lateral edge of a wall 56. Wall 56 is perpendicular to belts 40, is substantially rectangular, and presents a width substantially equal to the distance between belts 40, and a height approximately equal to but no more than the thickness of a half packet 2 and the height of channel 52. Each side member 54 is connected to respective belt 40 by a central screw 57 substantially located at wall 56 and defining, with screw 57 of the other side member 54, a virtual hinge 58 about which respective track 53 rotates in relation to belts 40. Each side member 54 presents a longitudinal outer rib 59 which engages a respective guide 60 extending between stations 47 and 50 and parallel to plate 51, for maintaining branches 46 of belts 40 and respective tracks 53 perfectly parallel to plate 51. When the relative tracks 53 are aligned, walls 56 of each pair of adjacent tracks 53 define a respective pocket 29 for feeding a respective half packet 2 in direction 30 and along channel 52.

As shown in FIG. 2, at reject station 48, conveyor 28 cooperates with a known push device 61 which, operating through channel 52 and crosswise to direction 30, provides for expelling a half packet 2 from a stationary pocket 29 in station 48 following a reject signal emitted in known manner by a known control unit (not shown).

As shown in FIGS. 6 and 7, at restoring station 49 downstream from reject station 48 in direction 30, conveyor 28 cooperates with a restoring device 62 comprising a box 63 which is moved through channel 52 and crosswise to direction 30 by an actuating device 64 controlled by said control unit (not shown), for removing a half packet 2 from a stationary pocket 29 in station 49, or for feeding a half packet 2 into a stationary empty pocket 29 in station 49.

Box 63 is, mounted in sliding manner inside an opening 65 (FIG. 2) formed crosswise to direction 30 through plate 51, and comprises a bottom plate 66 located beneath and substantially contacting the free end of walls 56 of tracks 53 on bottom branches 46 of belts 40, and which underneath presents a bracket 67 extending downwards inside opening 65 and connected to the free end of the output rod 68 of actuating device 64. Plate 66 is substantially rectangular with a width, measured parallel to direction 30, substantially equal to the width of a half packet 2, and presents, at its opposite longitudinal ends, two walls 69 perpendicular to walls 56 of tracks 53 on bottom branches 46 of belts 40 and extending upwards from plate 66 to substantially contact tracks 53.

Walls 69 define, on the topside of plate 66, a trough divided by a central partition 70 into two compartments 71a and 71b, each for receiving a respective half packet 2 with its longer longitudinal axis perpendicular to direction 30, and with its larger lateral surface contacting plate 66.

Figure 8:
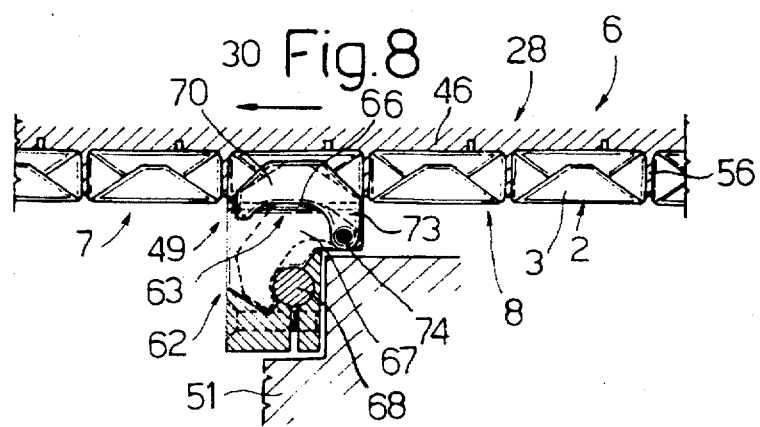
FIG. 8 shows a section along line VIII—VIII in FIG. 7.

As shown in FIG. 8, partition 70 is collapsible, is fitted through an opening 72 in plate 66, and presents, on the end upstream in direction 30, an appendix 73 extending beneath plate 66 and mounted for rotation on a pin 74 fitted horizontally to bracket 67 and crosswise to direction 30 and about which partition 70 is rotated, in opposition to a spring (not shown), from a raised position above plate 66, to a bottom limit position beneath plate 66 and contacting rod 68 of actuating device 64.

Whereas loading, reject and restoring stations 47, 48 and 49 each extend over one pocket 29, unloading station 50, at the output end of branch 46 of belts 40 with reference to direction 30, extends over two pockets 29, and is located just beyond the end of plate 51 and over the path of outer pockets 75 of a transfer wheel 76 constituting the input wheel of output portion 9 of wrapping line 6. Wheel 76 rotates about a vertical axis 77 perpendicular to axes 18 and 19, and comprises a central drum 78 from which pockets 75 project radially outwards. Each pocket 75 is defined by a substantially rectangular frame 79 lying in a substantially horizontal plane parallel to the upper surface 51a of plate 51, and is divided into two half pockets 75a and 75b of the same size as pockets 29 by a partition 80 fitted to frame 79 and perpendicular to the radius of drum 78 through frame 79. Each frame 79 is fed in steps about axis 77, and is arrested and positioned at unloading station 50 with half pockets 75a and 75b directly beneath two corresponding pockets 29 also stationary in station 50.

As shown clearly in FIGS. 3, 4 and 5, pairing device 12 comprises a fixed frame 81 substantially similar to frames 79 and presenting a central partition 82 similar to partitions 80 and defining, inside frame 81, two pockets 83a and 83b. Frame 81 is located at unloading station 50, between the path of frames 79 and the bottom branch 46 of belts 40.

Pairing device 12 also comprises two actuating devices 84 and 85 located respectively over and beneath the plane of surface 51a, for moving respective pairs of plates 86, 87 and 88, 89 back and forth in direction 90 parallel to axis 77. More specifically, plates 86 and 87 are fitted to the branches of a fork 91 integral with the output rod 92 of actuating device 84, so as to move through two stationary pockets 29 at unloading station 50, and through the two pockets 83; and plates 88 and 89 are fitted to the branches of a fork 93 integral with the output rod 94 of actuating device 85, so as to move through two stationary pockets 75a and 75b at unloading station 50, and through the two pockets 83. Plates 87 and 89 are arranged facing each other and adjacent to the end of plate 51, and plate 89 is in the form of a comb facing the opposite way to direction 30.

Pairing device 12 also comprises a provisional supporting device 95 comprising a plate 96 substantially coplanar with plate 66 and mounted so as to slide, in direction 30 and by virtue of an actuating device 97, on a sunken portion of surface 51a extending between restoring station 49 and unloading station 50. On the end facing station 50, plate 96 comprises an end portion in the form of a comb 98 of a length approximately equal to but no more than the width of a half packet 2. Comb 98 is engaged by comb plate 89, and is movable back and forth, by actuating device 97, between a forward position directly over pocket 83a of frame 81, and a withdrawn position over surface 51a and fully clear of pocket 83b.

In actual use, half packets 2, formed in known manner (in exactly the same way as for normal packets) as they are fed forward by wheels 13 and 14, are transferred by device 27 into respective pockets 29 on conveyor 28, and define a single succession 8 about wheel 14 and along conveyor 28. More specifically, on being fed to transfer device 27, each half packet 2 is gripped between push device 31 and counterpush device 32; devices 31 and 32 are shifted simultaneously to remove half packet 2 from respective pocket 26 and feed it into channel 35 and on to push device 36; half packet 2 is gripped between push device 36 and counterpush device 37; and devices 36 and 37 are shifted simultaneously to feed half packet 2 along channel 35 and into a respective stationary pocket 29 at loading station 47.

Each half packet 2 is then slid in steps along surface 51a to reject station 48 where, in the event a defect has been detected beforehand in the manufacture and/or filling of cigarettes 5 and/or in the formation of wrapping 3, it is engaged by push device 61 and expelled from pocket 29.

If passed, half packet 2 is fed in steps through an empty compartment 71 of box 63 maintained stationary at restoring station 49 and aligned with conveyor 28, and is fed by conveyor 28 in steps to unloading station 50.

Along conveyor 28, each half packet 2 defines, with one of the two adjacent half packets, a pair 11 which gradually engages station 50. More specifically, and as shown in FIGS. 3 to 5, as a first of the two half packets 2 in pair 11 is about to engage station 50, plates 86 and 87 are in the raised position over channel 52, plates 88 and 89 are positioned beneath two pockets 75 on wheel 76 to support the two half packets 2 of the previous pair 11, and plate 96 is in the forward position with comb 98 projecting in relation to plate 51. In the course of the next step of conveyor 28, a first half packet 2 in the pair 11 to be transferred from conveyor 28 to wheel 76 slides on to comb 98 (FIG. 3); frame 79 supporting pockets 75 engaged by the previous pair 11 clears the space over plates 88 and 89; and plates 88 and 89 are raised (FIG. 4) through the empty pockets 75 of the next frame 79 into a position wherein their upper surface is coplanar with surface 51a. In this position (FIG. 4), plate 89 engages comb 98 which, upon plates 88 and 89 moving into the raised position, is moved into the withdrawn position over plate 51 (FIG. 5). In the course of the next step, conveyor 28 feeds both half packets 2 in pair 11 into station 50, and plates 86 and 87 one one side and plates 88 and 89 on the other are lowered simultaneously (FIG. 5) to feed the two half packets 2 through frame 81 and into respective pockets 75 on wheel 76.

At this point, wheel 76, which step-feeds pairs 11 in succession 10 at the same rate as pairing device 12 and at half the rate of conveyor 28 and wheels 13 and 14, feeds pairs 11 to follow-up wrapping wheels (not shown) which, in known manner, provide for folding a known blank (not shown) about each pair 11, wrapping each pair 11 inside an outer wrapping (not shown), and so forming a known twin packet (not shown).

Now let us consider the reverse situation wherein half packet 2 is rejected in station 48 so that an empty pocket 29 is fed towards station 50, and bearing in mind, as already stated, that each half packet 2 traveling along conveyor 28 is associated and forms a pair 11 with the adjacent half packet 2. In the event either one of half packets 2 in pair 11 is rejected, the other half packet 2 in the incomplete pair should also, at least theoretically, be rejected. This is avoided, however, by the restoring device which operates selectively in two distinct modes depending on whether or not one of compartments 71 is engaged by a half packet 2.

As the second of said operating modes is easily deducible from the first, the following description will be confined to the first mode as of the condition in which both compartments 71 are empty.

In said first operating mode, both compartments 71, as stated, are empty and one of them, e.g. compartment 71a, is located along the path of walls 56 of tracks 53. When the half packet 2 corresponding to the rejected one is arrested inside compartment 71a, box 63 is shifted by actuator device 64 so as to expel the half packet 2 in channel 52 and align the empty compartment 71b with the path of walls 56 of tracks 53. This therefore results in the formation of a further empty pocket 29 next to the one vacated in reject station 48, and in the formation of a completely empty frame 79 on wheel 76, which is compensated by machine 1 in known manner by a one-step suspension in the supply of wrapping material (not shown) to output portion 9 of line 6.

The half packet 2 inside compartment 71a is "parked" alongside succession 8 until a further pocket 29 is vacated at the reject station and arrested inside the empty compartment 71b at restoring station 49; at which point, actuator 64 is operated to shift box 63 back to its original position, i.e. wherein compartment 71a is aligned with tracks 53, and so feed the "parked" half packet 2 back into succession 8 inside the pocket 29 vacated at reject station 48.

This therefore provides for preventing incomplete pairs 11 from being supplied to output portion 9 of wrapping line 6, as well as for preventing the rejection of half packets 2 with no defects.

The fact that machine 1 as described above comprises a wrapping line 6 with an input portion 7 along which half packets 2 are fed in a single succession 8 undoubtedly involves disadvantages in terms of the high operating speed of portion 7, which must be operated at twice the speed of output portion 9. This is amply compensated for, however, by the fact that, with the exception of a change in format, portion 7 is substantially identical to the input portion of a standard packet wrapping line and as such is relatively economical and highly reliable. Moreover, the fact that half packets 2 are fed in a single succession 8 along portion 7 not only provides for minimizing servicing time and expense, but also enables the use of restoring device 62, which would be substantially impossible in the event two parallel successions 8 of half packets 2 were to be fed along input portion 7 of line 6.

We claim:

1. A method of producing twin packets of cigarettes (5) comprising two half packets (2) with respective foil wrappings and arranged flat and side by side inside a same outer wrapping, the method comprising the steps of feeding a single first succession (8) of half packets (2) along a wrapping line (6) having an input portion (7) and an output portion (9), said first succession (8) being fed along said input portion (7); restoring any vacant half packet along said first succession (8) by selectively transferring a half packet (2) from a first location in the first succession (8) to a second location in the first succession (8); and transferring the half packets (2) successively to said output portion (9) by grouping the half packets (2) into groups (11) each comprising two co-planar half packets (2) arranged side by side to form, at said output portion (9), a single second succession (10) of said groups (11).

2. A method as claimed in claim 1, wherein said first (8) and second (10) successions are step-fed along the respective input and output portions (7, 9) of the wrapping line (6) at a first and second rate respectively; the first rate being twice the second rate.

3. A method as claimed in claim 1, further comprising rejecting defective half packets (2) from respective locations in the first succession (8); said rejecting being performed prior to said restoring.

4. A method as claimed in claim 3, wherein the location, in the first succession (8), vacated by a rejected half packet coincides with a location adjacent, in the first succession (8), to said first location of a half packet (2) transferred at said restoring.

5. A method as claimed in claim 3, wherein the location, in the first succession (8), vacated by a rejected half packet coincides, in the first succession (8), with said second location of a half packet (2) transferred at said restoring.

6. A packing machine for producing twin packets of cigarettes (5) comprising two half packets (2) with respective foil wrappings and arranged flat and side by side inside a same outer wrapping, the machine comprising a wrapping line (6) including an input portion (7) for a single first succession (8) of half packets (2), an output portion (9) for a single second succession (10) of groups (11), each comprising two co-planar half packets (2) arranged side by side; said input portion (7) comprises a conveyor (28) having a number of single pockets (29), each for receiving a respective half packet (2) and feeding said half packet in a given traveling direction (30); the two co-planar half packets (2) forming a respective said group (11) being two half packets (2) aligned in said direction (30) in said first succession (8); restoring means for restoring any vacant half packet along said first succession (8); and a pairing device (12) interposed between the input (7) and output (9) portions and which provides for successively forming the groups (11) by grouping into twos the half packets (2) issuing from the input portion (7), and for successively feeding the groups (11) to the output portion (9); said conveyor (28) comprises a transportation branch (46) extending through a loading station (47), a restoring station (49) and an unloading station (50) arranged successively in said traveling direction (30); said pairing device (12) being located at said unloading station (50); and said restoring means (62) being provided at said restoring station (49) for selectively transferring a half packet (2) from a first location in the first succession (8) to a second location in the first succession (8).

7. A machine as claimed in claim 6, further comprising rejecting means (61) for expelling half packets (2) from the first succession (8); the rejecting means (61) being located upstream from the restoring station (49) in said traveling direction (30).

8. A machine as claimed in claim 7, wherein said conveyor (28) is a track conveyor (28) having a succession of tracks (53); the tracks (53) in each pair of adjacent tracks (53) defining a respective said single pocket (29).

9. A machine as claimed in claim 7, wherein said output portion (9) comprises pocket conveyor means (76) including a number of double pockets (75), each for receiving a respective said group (11); each double pocket (75) being aligned, at said unloading station (50), with a pair of single pockets (29) in a further direction (90) extending transversely of said traveling direction (30) of the single pockets (29).

10. A machine as claimed in claim 9, wherein said pairing device (12) comprises push means (91) and counterpush means (93) movable back and forth in said further direction (90) for successively transferring pairs of adjacent half packets (2) from respective adjacent single pockets (29) in said unloading station (50) to a corresponding double pocket (75); and provisional supporting means (95) movable in said traveling direction (30) to and from an operating position wherein they cooperate with said counterpush means (93) to permit said conveyor (28) to advance one step during the transfer of said group (11) from the input portion (7) to the output portion (9) of said wrapping line (6).

\* \* \* \* \*